United States Patent [19]
McPhee

[11] 3,774,603
[45] Nov. 27, 1973

[54] MEDICAL LIQUID ADMINISTRATION SET WITH OPTICAL LIQUID LEVEL INDICATOR

[75] Inventor: Charles J. McPhee, Sylmar, Calif.

[73] Assignee: American Hospital Supply Corporation, Evanston, Ill.

[22] Filed: Nov. 26, 1971

[21] Appl. No.: 202,243

[52] U.S. Cl................. 128/214 C, 73/327, 222/158
[51] Int. Cl............................................. A61m 05/16
[58] Field of Search............ 128/213, 214 R, 214 E, 128/214 C, 214.2, 227, 272; 73/327; 84/97; 137/559; 40/310; 222/157-159

[56] References Cited
UNITED STATES PATENTS
3,690,312  9/1972  Leibinsohn.................. 128/214 R X
2,303,154  11/1942  Armstrong........................ 73/327
2,356,267  8/1944  Pelunis........................... 73/327 UX
3,216,419  11/1965  Scislowicz....................... 128/214 C
3,217,709  11/1965  Schneider et al. .............. 128/214 C FOREIGN PATENTS OR APPLICATIONS
595,775  7/1925  France................................. 73/327

Primary Examiner—Dalton L. Truluck
Attorney—Larry N. Barger et al.

[57] ABSTRACT

A medical liquid administration set with an enlarged transparent measuring chamber that has two vertical opaque stripes on a rear half of the chamber and has volumetric calibrations on its front half. The transparent chamber wall, opaque stripes, and a transparent liquid partially filling the chamber combine to create an optical illusion of a lateral offset in at least one of the stripes between air and liquid in the chamber. This provides an easy-to-read indicator of liquid level within the chamber.

6 Claims, 7 Drawing Figures

Patented Nov. 27, 1973

MEDICAL LIQUID ADMINISTRATION SET WITH OPTICAL LIQUID LEVEL INDICATOR

BACKGROUND

Administration sets are often used to receive liquid from a suspended parenteral liquid container and deliver it to a patient. Some of these adminstration sets have enlarged measuring chambers of less volume than the bottle. The purpose of these measuring chambers is to get a more accurate measurement of smaller volumes of dispensed liquid. For instance, an administration set connected to a 1 liter (1,000 ml.) bottle might have a 100 ml. measuring chamber that is calibrated to within an accuracy of 1 ml. The reason for this arrangement is that a large 1 liter bottles does not have the volumetric accuracy of a small measuring chamber.

One of the main problems with these measuring chambers and administration sets is that the liquid level is very difficult for a nurse or physician to read. This is because the liquid and the wall of the chamber are both transparent. When a nurse or physician view the partially filled measuring chamber from a distance it often appears entirely transparent and a mistake could be made concerning how much liquid is present in the chamber.

The problem is not nearly as pronounced when the liquid being dispensed has a substantial color or tint to it. However, for medical reasons many liquids being administered to patients are transparent. No foreign coloring material is added, because a patient might react to such coloring material.

SUMMARY OF THE INVENTION

I have overcome this problem of readily discerning the air-liquid interface within a measuring chamber of a parenteral liquid administration set where the liquid being administered is transparent.

The transparent measuring chamber of my invention includes on its outer surface two vertical opaque vertical stripes that extend from top to bottom of the chamber. These stripes are on a rear half of the transparent chamber while the front half has volumetric calibrations. The measuring chamber has a cylindrical transparent wall and when partially filled with transparent liquid combines with the two vertical opaque stripes to create an optical illusion of a lateral offset in at least one of the stripes exactly at the air-liquid interface. The two stripes separated by vertical transparent section of the chamber create this lateral offset illusion over a wide angle viewing range even though the offset may appear different from different viewing angles. At some viewing angles the offset of one or more stripes appears to be on the left, while at other view angles it appears to be on the right. At still another viewing angle the opaque stripes below the air-liquid interface appear to disappear altogether. From another viewing angle the two opaque stripes below the air-liquid interface form an optical illusion that blends them together so the entire chamber below the interface appears to be opaque.

THE DRAWINGS

DETAILED DESCRIPTION

Figure 1:
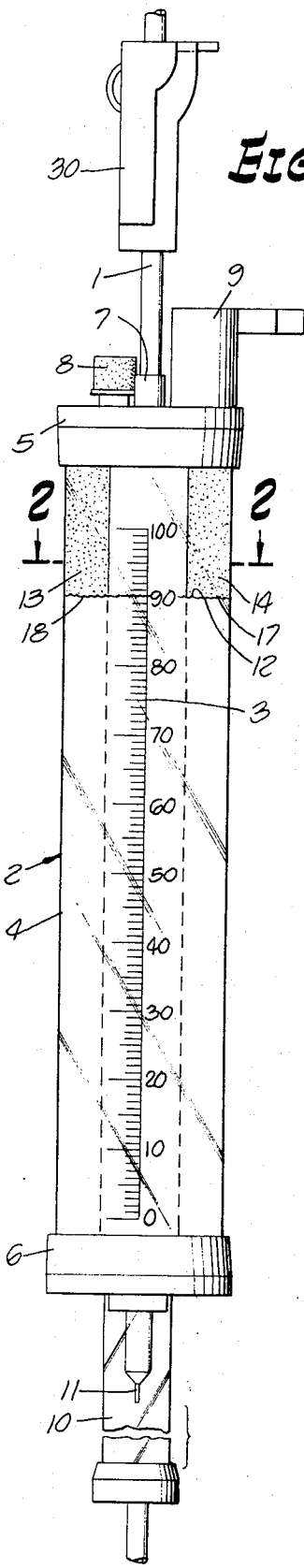
FIG. 1 is a front elevational view of the measuring chamber showing the optical illusion of the lateral offset in the two stripes when viewed straight on from its frontal calibrations.

The administration set described in this invention includes a flexible conduit 1. This conduit connects between a liquid supply bottle and a patient as will be explained in more detail in FIG. 7. Referring now to FIG. 1 the flexible conduit has an enlarged measuring chamber 2 connected in series with this flexible conduit. This enlarged chamber has calibrated inidicia 3 shown here to measure between 0 and 100 ml. If desired, the chamber can be made longer and have a capacity of 150 ml. This chamber 2 includes a cylindrical transparent side wall 4 connected at its upper end to a top cap 5 and at its lower end to a bottom cap 6. The top cap has an inlet 7, an additive medication puncture site 8 and a valved vent system 9. The details of the top cap and valve 9 are explained in more detail in a co-pending application entitled "MEDICAL LIQUID ADMINISTRATION SET FOR RATE OR VOLUME DELIVERY," Ser. No. 202,505, filed Nov. 26, 1971.

Connected to bottom cap 6 is also a secondary drip chamber 10 with a drip former 11. The purpose of this secondary drip chamber is to measure the flow rate of liquid in the administration set simultaneously with the volume measurement taken in the enlarged chamber 2.

As shown in FIG. 1 the transparent chamber has an air-liquid interface 12 which shows the chamber contains 90 ml. of liquid. As liquid is dispensed from this chamber this interface or liquid surface level will descend. Because the volume delivered is directly measured by interface 12, it is very important to accurately know it s position.

Figure 2:
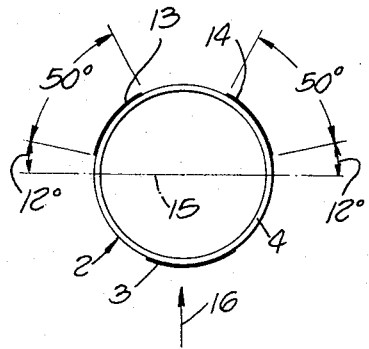
FIG. 2 is a cross sectional view taken along line 2—2 of FIG. 1.

In my invention there are provided two vertical opaque stripes 13 and 14 which make interface 12 much more visible. These stripes 13 and 14 are printed on an exterior its the transparent side wall. I have found that opaque stripes of medium blue color contrast very well with the transparent liquid in the chamber and the transparent chamber wall itself. As shown in FIG. 2 each stripe occupies approximately 50° of the circumference of the cylindrical side wall. These stripes could each cover between 30° and 65° of the cylindrical wall's surface. Also each stripe is spaced approximately 12° rearwardly of a diametric plane 15 shown in dotted line in FIG. 2, but could be from 5° to 20° back from the diametric plane. There is a transparent segment between the two stripes of from 40° to 70° of the circumference of the chamber. This plane 15 separates the rear half of the chamber from the front half. The front half contains the indicia 3.

As shown in FIG. 2 the arrow 16 indicates the position of the viewer and the direction of his eyesight. When the viewer looks head on into indicia 3 the two opaque stripes 13 and 14 will appear as shown in FIG.

1. In FIG. 1 the two stripes are readily visible above interface 12. Below interface 12 the liquid which might be distilled water, normal saline, etc., causes an optical defraction of the light rays causing the two stripes to optically disappear below the interface 12. This disappearance is an optical illusion which provides very sharp apparent offsets 17 and 18 at the interface 12. Thus a nurse can readily see how full the chamber 2 is even though she may be several feet from the administration set.

Figure 3:
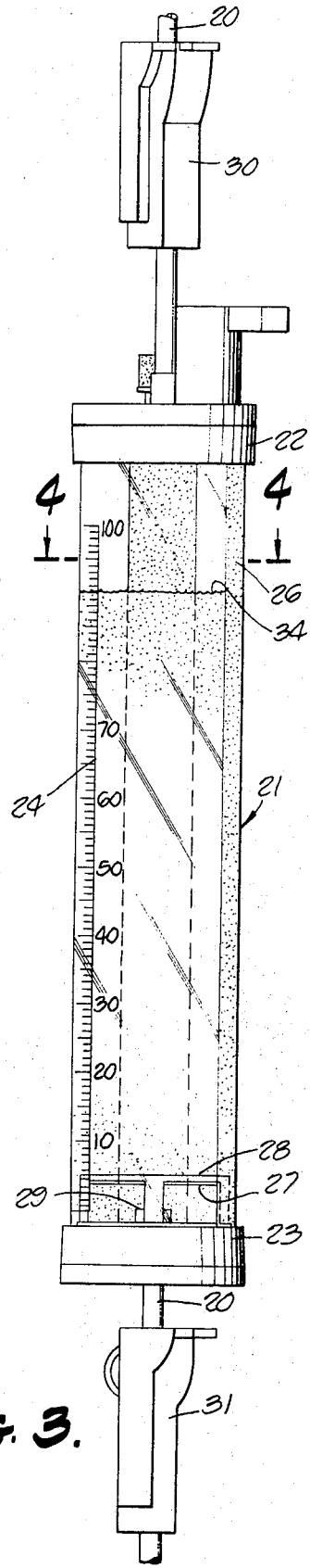
FIG. 3 is a view of the measuring chamber of this invention when viewed from the right of the calibrations.

In FIG. 3 a very similar administration set is shown having conduit 20 and enlarged chamber 21 with a top cap 22 and a bottom cap 23. The chamber portion of this administration set is identical with that shown in FIG. 1 in regard to the indicia 24 and the opaque stripes 25 and 26. There is a slight modification in that the secondary drip chamber 10 has been eliminated and conduit 20 connects directly to bottom cap 23. There is also a float valve 27 maintained within a cage 28. As valve 27 descends when the chamber 21 empties it will shut off by seating against valve seat 29. Liquid flow into chamber 21 is controlled by roller clamp 30 and liquid flow out of chamber 21 is controlled by roller clamp 31.

Figure 4:
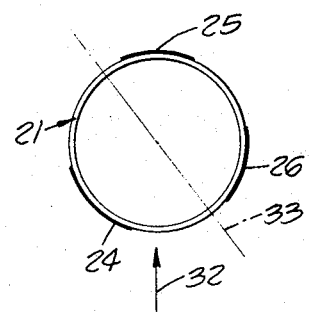
FIG. 4 is a sectional view taken along line 4—4 of FIG. 3 showing the directional view.

The sectional view through 4—4 as shown in FIG. 4 illustrates the optical illusion created when the chamber 21 is rotated from that shown in FIG. 2 so the viewer sites along arrow 32. The front and rear half of the chamber are still shown separated by a diametric plane 33. When the viewer looks at the chamber from this viewing angle the two opaque stripes 25 and 26 give an optical illusion that the entire chamber beneath an interface 34 is opaque. In the drawings some of the numerals have been blanked out to better illustrate the opaqueness that appears below interface 34 when viewed from this angle. However, the actual chamber 21 will readily show both the indicia 24 and the opaque stripes 25 and 26. This is because the indicia will be on the forward half of the chamber toward the viewer. The opaque stripes 25 and 26 will form an opaque background on a rear half of the chamber. The transparent liquid will be between the indicia and opaque background.

Figure 5:
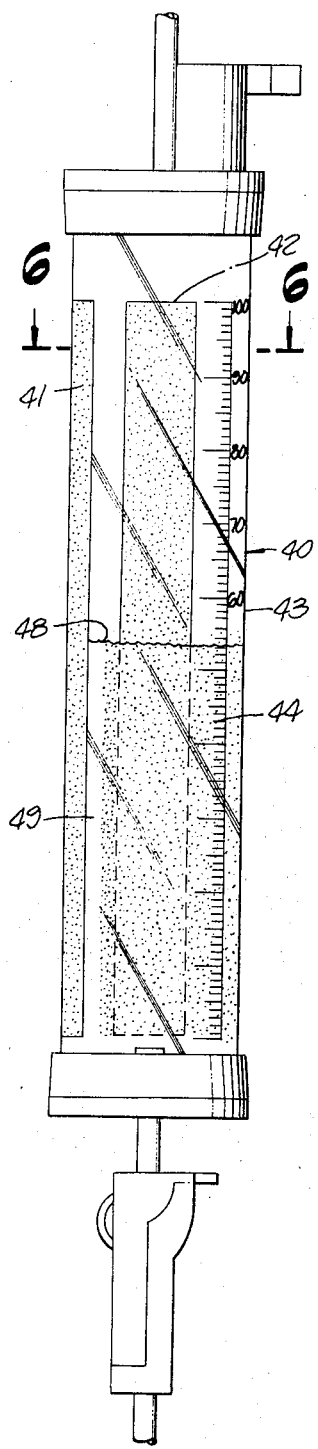
FIG. 5 is a view of the measuring chamber taken from the left of the calibrations along the direction shown in FIG. 6.
Figure 6:
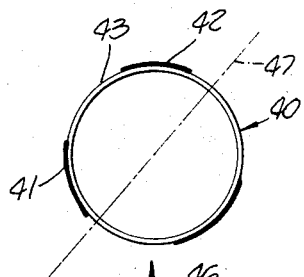
FIG. 6 is a sectional view taken along line 6—6 of FIG. 5 showing the viewing angle.

In FIG. 5 a chamber 40 is shown which is similar to the other two previously mentioned transparent chambers. However, here the two opaque stripes 41 and 42 extend only along the calibrated length of the transparent side wall 43. The stripes 41 and 42 and indicia 44 all have the same relationship to each other as the stripes and indicia of the FIG. 1 and FIG. 3 versions. As shown in the FIG. 6 sectional view, the chamber has been rotated so the viewer sites along arrow 46. The front and rear half of the chamber are separated by diametric plane 47. In FIG. 6 the stripe 42 is not directly centered behind the viewing site of arrow 46 and the optical illusion appears as shown in FIG. 5. Here, the interface 48 is shown as having dropped to approximately 55 ml. because of liquid drainage. The opaque stripe 41 appears as a straight thin band along the left side of the chamber. Opaque stripe 42 appears to substantially widen at interface 48 to provide an opaque lateral offset at both sides of stripe 42. Because of the viewing angle the two opaque stripes do not make the entire liquid portion of the chamber contents to appear backed by solid opaque background. At this viewing angle there is a transparent section 49. As in FIG. 3 the numerical scale has been sectioned out for purposes of clarity in the drawings. In actual use these numbers would be readily apparent to the viewer.

Figure 7:
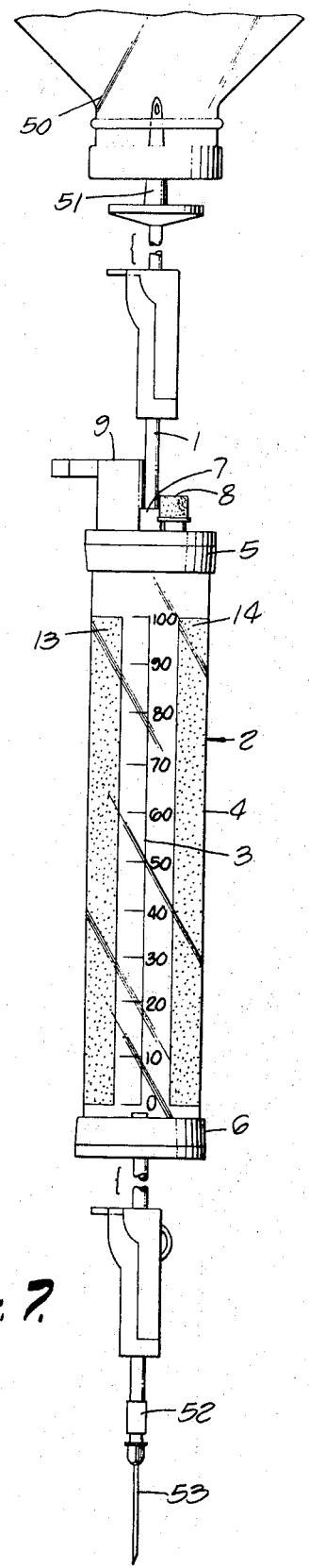
FIG. 7 is a reduced front elevational view of the empty measuring chamber containing the two opaqure stripes and showing the administration set connecting between a liquid supply bottle and a venous needle.

In FIG. 7 the chamber shown in FIG. 1 is illustrated in reduced scale and attached to a liquid supply bottle 50 through a spike 51 at its top end and has an adapter 52 and venous needle 53 connected at its lower end. Also in FIG. 7 the chamber 4 is illustrated containing no liquid. Since there is no transparent liquid to defract the light and create the optical illusion, the two opaque stripes 13 and 14 appear as thin vertical bands along the left and right side of the chamber.

In the above description three slightly different measuring chambers have been used to illustrate my invention. However, it should be kept in mind that each of these three measuring chambers (FIG. 1, FIG. 3 and FIG. 5) have the indicia and two opaque stripes in the same annular position relative to each other. The different appearing lateral offsets in the opaque stripes occur because of the different viewing angles as represented by arrow 16 of FIG. 2, arrow 32 of FIG. 4, and arrow 46 of FIG. 6.

In the foregoing illustrations and descriptions I have used specific examples to describe my invention. However, it is understood that those skilled in the art can make certain modifications to these examples without departing from the spirit and scope of the invention.

I claim:

1. A medical liquid administration set comprising an enlarged liquid holding measuring chamber having a tubular transparent wall connected to top and bottom closures; said adminstration set having an inlet opening through the top closures; and an outlet opening through the bottom closure, both of said openings being substantially smaller in cross section than the transparent tubular wall; an inlet conduit and an outlet conduit respectively connected to the inlet and outlet openings of the closures, said inlet and outlet conduits being substantially smaller in cross section than the transparent tubular wall; connector means at an end of the inlet conduit for connecting with a liquid supply source; adapter means at an end of the outlet conduit for dispensing liquid; said chamber including a front half and rear half; a plurality of permanent, opaque stripes extending longitudinally on the rear half of the chamber; said tubular transparent wall having an intermediate longitudinal transparent area separating the opaque stripes; permanent, volumetric measuring indicia on a front half of the tubular transparent wall; the opaque stripes and volumetric measuring indicia having a fixed relationship to each other regardless of rotational movement of a tubular transparent wall relative to supporting structure; said opaque stripes and the longitudinal transparent wall section therebetween combining and forming an optical illusion of a substantial lateral offset at one or more of the opaque stripes at an interface between air and liquid when the measuring chamber is partially filled with liquid and the front half of the tubular transparent chamber is viewed from widely different viewing angles at the front of the transparent wall including the liquid level can be read at a substantial distance and errors in reading are substantially eliminated.

2. The combination as set forth in claim 1 wherein the stripes are parallel to each other and to an axis of the cylindrical tubular chamber.

3. The combination as set forth in claim 2 wherein each opaque stripes has a width of from 30° to 65° of the tubular chamber's circumference.

4. The combination as set forth in claim 2 wherein each opaque stripe is spaced rearwardly from 5° to 20° back from the diametric plane.

5. The combination as set forth in claim 1 wherein the opaque stripes are of a blue color to provide a clear optical contrast with the transparent chamber wall and transparent liquid therein.

6. A medical liquid administration set comprising an elongated tubular conduit having an upper end portion adapted to connect to a liquid supply source, a lower end portion adapted to connect with a patient; an enlarged volumetrically measuring chamber connected in series with the conduit, said chamber including a top cap, a bottom cap and a cylindrical transparent wall having ends joined to said respective caps; two vertical parallel opaque stripes on said transparent tubular wall, said stripes being spaced apart by a vertical transparent section of the tubular wall covering between 40° and 70° of its circumfernece, each of said stripes occupying between 40° and 60° portions of the circumferential distance of the transparent cylindrcal chamber; both of said stripes being located on a rear half portion of the culindrical chamber defined by a vertical diametric plane; and volumetric indicia located on a front half of the cylindrical chamber, the opaque stripes and vertical longitudinal transparent wall section therebetween combining to form optical illusionary lateral offsets immediately adjacent one or more of the opaque stripes at an interface between air and liquid in said measuring chamber partially filled with said liquid and the front half of the tubular measuring chamber is viewed through widely different viewing angles.

* * * * *